US012425399B2

(12) United States Patent
Nagaraj et al.

(10) Patent No.: US 12,425,399 B2
(45) Date of Patent: Sep. 23, 2025

(54) DISTRIBUTED HIERARCHICAL AUTHENTICATION OF SYSTEM COMPONENT IDENTITIES

(71) Applicant: Cisco Technology, Inc., San Jose, CA (US)

(72) Inventors: Archana Nagaraj, San Ramon, CA (US); Chandana Prakash, Dublin, CA (US); Michael Gary Curcio, Apex, NC (US); Rachel Weeks, Oak Ridge, TN (US)

(73) Assignee: Cisco Technology, Inc., San Jose, CA (US)

( * ) Notice: Subject to any disclaimer, the term of this patent is extended or adjusted under 35 U.S.C. 154(b) by 275 days.

(21) Appl. No.: 17/701,299

(22) Filed: Mar. 22, 2022

(65) Prior Publication Data

US 2023/0308439 A1    Sep. 28, 2023

(51) Int. Cl.
*H04L 9/40* (2022.01)

(52) U.S. Cl.
CPC .............................. *H04L 63/0876* (2013.01)

(58) Field of Classification Search
CPC ....... H04L 63/0876; G06F 21/57; G06F 21/44
See application file for complete search history.

(56) References Cited

U.S. PATENT DOCUMENTS

| | | | |
|---|---|---|---|
| 2008/0270790 A1* | 10/2008 | Brickell | G06F 21/57 713/176 |
| 2009/0113219 A1 | 4/2009 | Aharonov et al. | |
| 2010/0071024 A1 | 3/2010 | Eyada | |
| 2011/0320599 A1* | 12/2011 | Matsumoto | G06F 21/305 709/225 |
| 2013/0054960 A1* | 2/2013 | Grab | H04L 63/0884 726/17 |
| 2014/0082353 A1* | 3/2014 | Everhart | H04L 9/3247 713/158 |
| 2015/0169875 A1* | 6/2015 | Ide | G06F 21/575 713/2 |
| 2017/0085568 A1 | 3/2017 | Rolfe et al. | |
| 2018/0041341 A1* | 2/2018 | Gulati | H04L 9/3263 |

(Continued)

FOREIGN PATENT DOCUMENTS

| | | | | |
|---|---|---|---|---|
| EP | 3940470 A1 * | 1/2022 | | G05B 19/058 |
| WO | WO-2010102259 A2 * | 9/2010 | | G06F 21/44 |

(Continued)

OTHER PUBLICATIONS

The PCT Search Report and Written Opinion mailed Jun. 6, 2023 for PCT application No. PCT/US23/15272, 10 pgs.

*Primary Examiner* — Jung W Kim
*Assistant Examiner* — James P Moles
(74) *Attorney, Agent, or Firm* — Lee & Hayes, P.C.

(57) ABSTRACT

In an example method, a presence of a component with a cryptographic identity is detected. The component is detected by an authenticator component capable of authenticating a component. The example method further includes determining an authentication status of the detected component. The authentication status of the component is added to an extensible list of volatile, runtime data. Further, the authenticator component signs the extensible list with a private key to create a group identity. Finally, the authenticator component sends the group identity to a next higher component in an authentication hierarchy.

19 Claims, 5 Drawing Sheets

(56) References Cited

U.S. PATENT DOCUMENTS

| | | | |
|---|---|---|---|
| 2018/0191501 A1 | 7/2018 | Lindemann | |
| 2018/0234410 A1* | 8/2018 | Lindemann | H04L 63/123 |
| 2018/0270051 A1 | 9/2018 | Roth et al. | |
| 2018/0351944 A1* | 12/2018 | Cho | H04L 9/3228 |
| 2019/0207962 A1* | 7/2019 | Wang | H04L 43/04 |
| 2022/0124086 A1* | 4/2022 | Gao | H04W 12/069 |
| 2022/0141041 A1* | 5/2022 | Parikh | G06F 21/44 |
| | | | 713/156 |
| 2023/0239165 A1* | 7/2023 | Young | H04L 9/0891 |
| | | | 713/175 |
| 2024/0104213 A1* | 3/2024 | Edwards | H04L 9/3263 |

FOREIGN PATENT DOCUMENTS

| | | | | |
|---|---|---|---|---|
| WO | WO-2011146305 A2 * | 11/2011 | | G06F 21/57 |
| WO | WO-2016058306 A1 * | 4/2016 | | H04L 9/32 |
| WO | WO-2017016318 A1 * | 2/2017 | | H04L 9/32 |
| WO | WO-2018044282 A1 * | 3/2018 | | G06F 21/32 |

\* cited by examiner

DISTRIBUTED HIERARCHICAL AUTHENTICATION OF SYSTEM COMPONENT IDENTITIES

TECHNICAL FIELD

The present disclosure relates generally to authenticating groups of components in a system simultaneously or substantially simultaneously.

BACKGROUND

Secure and predictable system operation depends on authenticating each device in a system to ensure the trustworthiness of the devices. Additionally, the overall system security, reliability, availability, and performance are affected by the trustworthiness of each device in the system. An important aspect of ensuring the trustworthiness of a device is authenticating the identity of the device. The IEEE 802.1AR standard for Local and Metropolitan Area Networks Secure Device Identity defines unique per-device identity installed at manufacturing time and used subsequently in device-to-device authentication exchanges that allow establishment of the trustworthiness of devices. The standard defines a secure device identifier (DevID) as an identifier that is cryptographically bound to a device. The identifier consists of a public key certificate containing a globally unique-per-device identity, and bound to a unique-per-device secret (private key) capable of creating a digital signature. Cryptographic device identity has several applications, including identity for network access, device identity and counterfeit protection, secure autoconfiguration and remote device management.

Currently, in order to verify the identity of each device in a system, cryptographic authentication of device identity is accomplished using a serialized approach that may be limited by one or more factors including communication bus bandwidth or the processing capabilities of the verifier. As defined by the IEEE 802.1AR standard, authentication is a multi-step process. Thus, for systems with hundreds or thousands of devices that are designed to establish trustworthiness of the devices prior to enabling normal operation, the existing serialized approach to authentication leads to unacceptable delays during system initialization and bootup.

Accordingly, there is a need to more efficiently verify the identity and authenticity of devices across a system before the system is fully booted.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
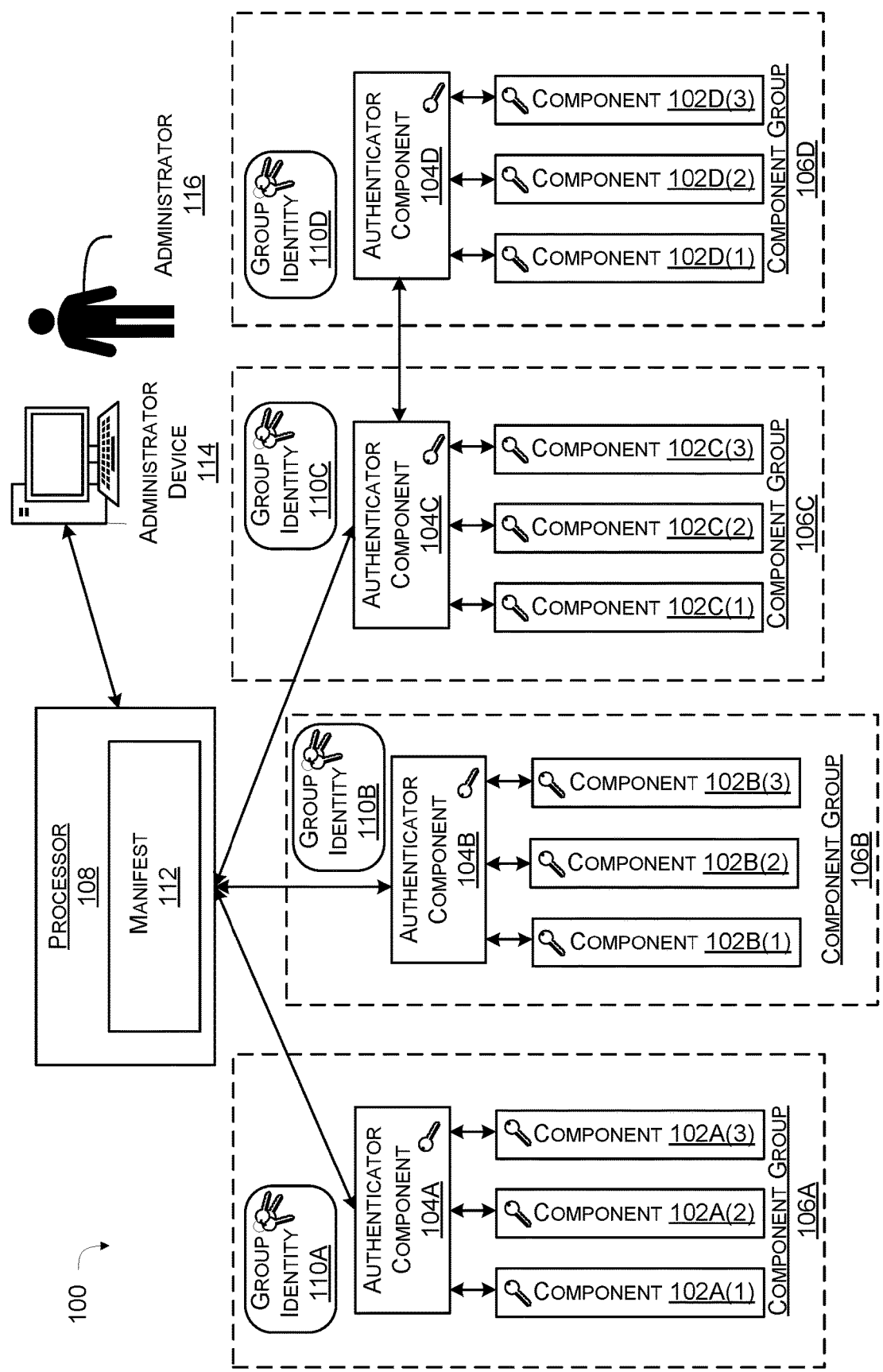
FIG. 1 illustrates an example environment for authenticating components in an authentication hierarchy.

This disclosure describes various implementations for authenticating system component identities in a hierarchy of component groups. An authenticator component in a component group detects components in the group that need authenticating. The authenticator component determines an authentication status of the detected components and adds the status of the detected components to an extensible list of volatile, runtime data. The authenticator component then signs the list and appends a digital signature, effectively creating a group identity, and sends the group identity to a next higher component in the authentication hierarchy.

Examples described herein provide a system including a processor and a non-transitory computer-readable media storing instructions that, when executed by the processor, cause the processor to perform operations. The operations include storing an indication that a component having a cryptographic identity is associated with an component group in a hierarchy of component groups, the component group including the component and an authenticator component capable of authenticating the component, receiving a group identity from the authenticator component, the group identity identifying: (i) the authenticator component and the component, and (ii) indicating that the authenticator component has authenticated the component, verifying the group identity, and storing information associated with the authenticator component and the component in a manifest of authenticated components at least partly in response to verifying the group identity.

In some cases, the component having the cryptographic identity is a first component and the computer-readable media is further configured to cause the one or more processors to perform acts including: storing an indication that a second component having a second cryptographic identity is associated with the component group, receiving a group identity from the authenticator component, the group identity identifying: (i) the authenticator component, the first component, and the second component, and (ii) indicating that the authenticator component has authenticated the first component and the second component, verifying the group identity, and storing information associated with the authenticator component, the first component, and the second component in the manifest of authenticated components at least partly in response to verifying the group identity.

In some instances, verifying the group identity includes determining that the authenticator component has a valid authentication status.

According to some implementations, the information stored in the manifest includes a component location ID, authentication status, product identification, and serial number for each authenticated component in the system.

In some examples, the example system further includes creating a table populated with information relating to authenticated components listed in the manifest and outputting the table to an administrator device.

In various cases, the group includes a first group identity, and further includes receiving a second group identity from an authenticator component including information relating to a change in a component in an component group, verifying the second group identity, and updating the manifest with information relating to the change.

According to some instances, the change includes at least one component removed from a location, a component added to a location, or a component removed from one location and added to a different location.

In some examples, the authenticator component is periodically polled to determine if a change relating to a component in a component group has occurred.

In various implementations, the component having the cryptographic identity is one of a Small Form-factor Pluggable (SFP) optical transceiver, a hot-swappable/redundant power supply, or a fan tray.

In some cases, the component having the cryptographic identity is a software component.

Examples described herein also provide a method implemented at least in part by an authenticator component, the method including: detecting a presence of a component with a cryptographic identity, determining an authentication status of the component, adding the authentication status of the component to an extensible list of volatile, runtime data, signing the extensible list with a private key to create a group identity and sending the group identity to a next higher component in an authentication hierarchy.

In some implementations, the method further includes determining that the authentication status of the component is valid by authenticating the cryptographic identity of the component, determining a location ID of the component, and extracting authentic information from the cryptographic identity, the authentic information including a product identifier (PID) and a serial number (SN).

In various cases, the method further includes extracting additional data from the cryptographic identity of the component, the additional data including a Platform Configuration Register (PCR) content or firmware version number.

According to some instances, the method further includes detecting a change relating to a component, determining an authentication status of the component associated with the change, updating the extensible list with the corresponding authentication information of the component associated with the change, signing the updated extensible list with the private key to create a new group identity and sending the new group identity to the next higher component in the authentication hierarchy.

In some cases, the change related to the component includes one of: the component removed from a location, the component added to a location, or the component removed from one location and added to a different location.

In some implementations, the component with the cryptographic identity detected is a second authenticator component to which the authenticator component is connected.

In some examples, the method further includes determining the authentication status of the component to be invalid or unsupported and marking the authentication status of the component as invalid or unsupported respectively, in the extensible list.

According to some cases, the next higher component in the authentication hierarchy is a processor.

Example Embodiments

Various implementations of the present disclosure will be described in detail with reference to the drawings, wherein like reference numerals present like parts and assemblies throughout the several views. Additionally, any samples set forth in this application are not intended to be limiting and merely demonstrate some of the many possible implementations.

Typically, to maximize the performance of a network system, individual components, such as hardware devices or software modules for instance, in the system require authentication to ensure overall system security, reliability, availability, and performance. This has led to a trend towards adding unique cryptographic identities to high value or critical hardware components that may be high incentive targets for supply chain and counterfeit attacks. In some instances, the high value hardware components may include but are not limited to, a Small Form-factor Pluggable (SFP) optical transceiver, a hot-swappable/redundant power supply, and fan trays, for example. Alternately or in addition, the component having the cryptographic identity may be a software component. However, current methods of authenticating components with cryptographic identities entail a serialized approach where each individual component in the system is authenticated one at a time, leading to unacceptable delays during system initialization and bootup.

Various implementations described herein address the current limitations of cryptographic identity authentication by providing an approach to authenticate multiple components in a system at once by grouping the components into component groups that form a hierarchy of component groups in the system. The component groups consist of an authenticator component and one or more other components. Each authenticator component is a component capable of authenticating other components in its group. Multiple component groups in the authentication hierarchy can run the authentication process simultaneously. Thus, the hierarchy of component groups can authenticate the components in a system in a fraction of the time that is required for current serialized approaches to cryptographic identity authentication.

This technology proposes the use of authenticator components in a hierarchy of component groups to authenticate system components concurrently. An authenticator component is a component with an additional capability to verify the cryptographic identity of one or more components, including other authenticator components. In some instances, at power-on, an authenticator component detects components that it is responsible for authenticating. There are multiple methods for detection. For example, a pluggable component (e.g. a SFP optical transceiver) in a component group may explicitly indicate its presence via an electrical signaling mechanism, for example, General Purpose Input/Output (GPIO) pins. In some embodiments, fixed components that are a permanent part of a system design may be implicitly assumed to be present by an authenticator component. In still another example, components may be detected by a process defined by the authenticator component.

Once an authenticator component detects a component to be authenticated, the authenticator component authenticates the identity of the component. The authentication may be done according to the IEEE 802.1AR Standard for Local and Metropolitan Area Network Secure Device Identity, for example. If the component is an authentic, the authenticator component marks the authentication status as valid and extracts authentic information from the component identity such as its product identifier (PID), serial number (SN) and any other additional data determined to be necessary, such as Platform Configuration Register (PCR) content or firmware version numbers, etc. In addition, the authenticator component determines the location ID of the component in the system. If the component is determined to be inauthentic, the authenticator component notes the location of the component in the system and marks the status of the component as invalid. If the authenticator component is not able to determine whether a component has a valid authentication status, the authenticator component marks the component as unsupported, noting the presence and location of the component, but does not extract the information pertaining to the component as described above. Alternately, in some instances, the authenticator component may extract the information pertaining to the component but marks it as unsupported or untrusted.

Once the authenticator component has determined the authentication status of each detected component, the authenticator component assembles an extensible list of volatile, runtime data, such as authentication status, component location, and the information extracted from the components as described above. The authenticator component then signs the list of data with the authenticator component identity's private key, creating a group identity for that component group. The authenticator component then sends the group identity to a next higher component in the authentication hierarchy. The next higher component may be another authenticator component, or it may be a processor at the top of the authentication hierarchy. The authenticator component may send the group identity to the next higher component in the authentication hierarchy automatically, or the authenticator component may wait to send the group identity until requested to do so by the next higher component in the authentication hierarchy.

A component detected by a first authenticator component may be a single component, or a second authenticator component to which the first authenticator component is connected. The first authenticator component authenticates the cryptographic identity of the second authenticator component by looking at the digital signature of the second authenticator component sent as part of a group identity. If the digital signature is valid, the first authenticator component determines that the second authenticator component is a valid component and can be trusted, and verifies the group identity received from the second authenticator component. The first authenticator component extracts the information from the extensible list in the group identity sent from the second authenticator component and pertaining to the authenticator component and the authenticated components the second authenticator component has authenticated, and adds the information to its own extensible list, signs the extensible list creating a group identity, and sends the created group identity to the next higher component in the authentication hierarchy.

System level authentication is achieved when a processor, at the top of the authentication hierarchy, authenticates each authenticator component to which the processor is directly connected and verifies each respective group identity. The processor then records the authenticated information in a manifest of authenticated components present in the system. The information relating to the authenticated components listed in the manifest may be used to populate a table, list, chart, or other visual aide for output to an administrator device.

According to some instances, at runtime, a change in a component's physical electrical signaling mechanism (e.g., GPIO pins) triggers an authenticator component to authenticate the component associated with the change. For example, a component removed from a location, a component added to a location, or a component removed from one location and added to a different location may trigger an authenticator component to update an extensible list with the corresponding authentication status, PID, SN, location ID and any other information determined to be necessary pertaining to the component associated with the change, sign the list with the private key of the authenticator component, and send the resulting group identity to a next higher component in the authentication hierarchy. Authenticator components will not reauthenticate components not associated with the physical electrical signaling change. In some instances, the authenticator updates the extensible list with the information associated with the physical electrical signaling change, signs the list, and sends the entire extensible list with signature to the next higher component in the authentication hierarchy. Alternately, the authenticator signs only the information relating to the component change and sends only the change information with signature to the next higher component in the authentication hierarchy. If the next higher component in the authentication hierarchy is another authenticator component, the next higher authenticator component updates its extensible list with the corresponding information relating to the component associated with the physical electrical signaling change, signs the updated list and sends the resulting group identity to the next higher component in the authentication hierarchy. Alternately, if the next higher authenticator component only receives the information relating to the physical electrical signaling change and signed by the sending authenticator component, the next higher authenticator component updates its extensible list with the change information, but only signs and sends the information relating to the physical electrical signaling change to the next higher component in the hierarchy. When the next higher component is a processor at the top of the authentication hierarchy, the processor updates the manifest with the information associated with the physical electrical signaling change.

FIG. 1 illustrates an example authentication hierarchy in a network system 100. In various implementations, one or more components 102 are associated with an authenticator component 104 in a component group 106. For example, components 102A(1), 102A(2), and 102A(3) are connected to authenticator component 104A in component group 106A, likewise, components 102B(1), 102B(2), and 102B(3) are connected to authenticator component 104B in component group 106B. An authenticator component may be connected directly to a processor 108 at the top of the authentication hierarchy, such as authenticator components 104A, 104B, and 104C. Alternately, an authenticator component may be connected to another authenticator component in a next higher level of the authentication hierarchy. This example implementation is shown with authenticator component 104D of component group 106D connected directly to authenticator component 104C of component group 106C.

In various implementations, one or more components 102 in a component group 106 that require authentication are detected by an authenticator component 104 that is part of the component group 106. The authenticator component 104 may detect a component 102 in multiple ways. In some instances, a pluggable component 102 (e.g., SFP optical transceiver) may explicitly indicate its presence via an electrical signaling mechanism such as GPIO pins. In another instance, a component 102 that is a permanent part of a system design may be implicitly assumed to be present by an authenticator component 104. Alternately or in addition, an authenticator component 104 may detect a component 102 by a process defined by the authenticator component 104.

The authenticator component 104 may authenticate the identity of the detected components 102 according to the IEEE 802.1AR standard for Local and Metropolitan Area Network Secure Device Identity. However, the authentication process is not limited to the IEEE 802.1AR standard and may be any appropriate authentication process used for authenticating components in a system. The authenticator component 104 determines an authentication status (e.g., valid, invalid, or unsupported) of each component 102 and adds the authentication status to an extensible list of volatile, runtime data. For the components 102 that are determined to be valid, the extensible list also includes, at least, the location ID of the component 102, a PID, and a SN extracted from a cryptographic identity of the component. If the component 102 is invalid or unsupported, the authenticator component 104 notes the invalid or unsupported authentication status and the location ID of the invalid or unsupported component 102 in the extensible list but does not include any other component specific data in the extensible list. Alternately, for some unsupported components, some information may be extracted from the component such as PID and SN. In some implementations, for a valid component 102, the authenticator component will also add additional information determined to be necessary such as PCR content or firmware version numbers, and the like.

In various instances, once an authenticator component 104 has added an authentication status and other pertinent information as described above for each component 102, to the extensible list, the authenticator component 104 signs the extensible list with a private key associated with its unique component identity, thereby creating a digital signature for an assembled group identity 110 for a component group 106. Thus, the group identity 110 contains a list of entries that uniquely identify each individual component 102 and the authenticator component 104 in the component group 106, which is digitally signed by the authenticator component 104. Each authenticator component 104 therefore creates one group identity 110 that includes information pertaining to each of the components 102 it has directly authenticated. For example, as illustrated in FIG. 1, in component group 106A, the authenticator component 104A detects and authenticates component 102A(1), component 102A(2), and component 102A(3). Thus, the group identity 110A contains information uniquely identifying the authenticator component 104A and component 102A(1), component 102A(2), and component 102A(3), and is signed with a private key of authenticator component 104A.

In some examples, for an authenticator component 104 that is not at the leaf level of the authentication hierarchy, such as authenticator component 104C illustrated in FIG. 1, the extensible list also includes the contents of the group identities obtained from authenticator components to which it is connected, in this case, the group identity 110C created by authenticator component 104C includes the contents of group identity 110D received from authenticator component 104D. Group identity 110D contains a list of entries that uniquely identifies the authenticator component 104D and component 102D(1), component 102D(2), and component 102D(3), thus this list of uniquely identified components in component group 106D is also included in group identity 110C.

In various instances, a group identity 110 sent from an authenticator component 104 is received by a processor 108 at the top of the authentication hierarchy. System level authentication is achieved once the processor 108 receives a group identity 110 from each authenticator component 104 that is in direct communication with the processor 108. For example, FIG. 1 illustrates authenticator component 104A, authenticator component 104B, and authenticator component 104C in direct communication with processor 108. Once authenticator component 104A, authenticator component 104B, and authenticator component 104C send their respective group identities 110A, 110B, and 110C to the processor 108, the processor 108 authenticates the digital signature of each authenticator component 104A, 104B, and 104C included in group identities 110A, 110B, and 110C respectively. Once authenticator component 104A, authenticator component 104B, and authenticator component 104C are authenticated by the processor 108, the processor 108 extracts the information that uniquely identifies each authenticator component 104 and each component 102 in the system from the group identities 110A, 110B, and 110C received from component groups 106A, 106B, and 106C respectively, and adds the information to a manifest 112 of authenticated components in the system. An example manifest 112 is illustrated and further described with reference to FIG. 2.

In some examples, the processor 108 may be communicatively coupled to, or be a part of, an administrator device 114 accessible by an administrator 116. The manifest 112 assembled by the processor 108 may be output to the administrator device 114 and provided to the administrator 116. The manifest 112 may be displayed on the administrator device 114 in tabular form, as a list, in a chart, or any other appropriate visual display for use by the administrator 116.

According to some instances, a change in a physical electrical signaling mechanism, such as GPIO pins, of a component 102 may trigger an authenticator component 104 to authenticate the component 102 associated with the change. For example, If component 102A(3) is added to component group 106A, authenticator component 104A will authenticate component 102A(3), add the authentication information pertaining to component 102A(3) to an already existing extensible list that contains identifying information for component 102A(1) and component 102A(2) already in component group 106A, recreate a group identity 110A by signing the updated extensible list with a digital signature, and send the recreated group identity 110A to the next higher component in the authentication hierarchy, in this case, the processor 108. Alternately, authenticator component 104A may only sign the authenticated information pertaining to newly added component 102A(3) and send to the processor 108. The processor 108, then updates the manifest 112 with the information related to component 102A(3), the component associated with the change. Alternately, if component 102A(3) is removed from component group 106A, authenticator component 104A updates the extensible list by removing information pertaining to component 102A(3), signs the updated extensible list with a private key effectively recreating group identity 110A, and sends the recreated group identity 110A to the processor 108. When a component change occurs, such as a new component added, an existing component removed, or an existing component removed from one location and added to a different location, only the component associated with the change is authenticated or re-authenticated. Existing components that have been previously authenticated and have not changed are not re-authenticated.

In some implementations, when an authenticator component 104 has generated a group identity 110, or when the group identity 110 changes due to a component 102 being added, removed, or changing location, the authenticator component 104 indicates the availability of an update to the next higher component in the authentication hierarchy by toggling its physical presence signal. In other implementations, authenticator components 104 are periodically polled by the next higher component in the authentication hierarchy to determine if a change relating to a component 102 in a component group 106 has occurred. In still another implementation, system component status updates may be triggered by an administrator or end user. In any one of these implementations, the authenticator component 104 may send a signed extensible list consisting of information uniquely identifying all the components 102 that the authenticator component 104 has authenticated, or the authenticator component may only sign and send the information relating to the component or components 102 that have been added, removed, or moved to a different location.

Figure 2:
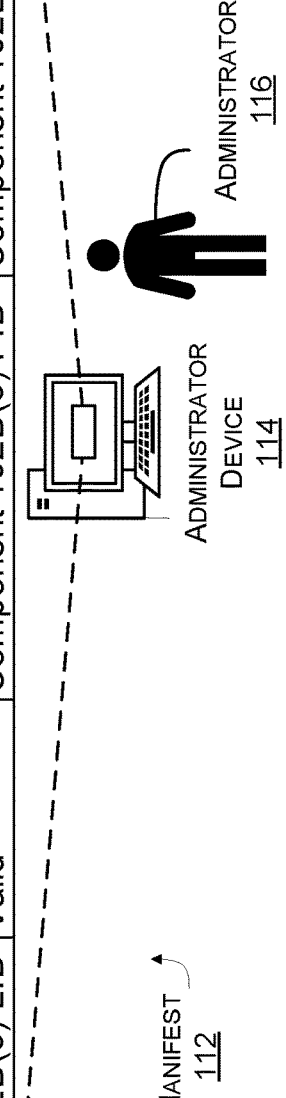
FIG. 2 illustrates an example manifest of the authenticated components in a system.

FIG. 2 illustrates an example manifest 112 as displayed on an administrator device 114 for use by an administrator 116. The example manifest 112, illustrated in this example in tabular form, shows information that uniquely identifies each component in a network system, such as the system illustrated in FIG. 1 and described above. Manifest 112 shows the authenticator components 104 and components 102 present in the authentication hierarchy as illustrated in FIG. 1. For the authenticator components 104 and each component 102, a location ID and authentication status is shown. For those components that have a valid authentication status, additional information associated with the component is also present. In this example, each valid component present in the system also has an associated PID and SN. In some instances, additional information may also be displayed for some valid components 102 or valid authenticator components 104, such as firmware version number, PCR content, or software version number. For components 102 that have been identified as invalid, they are identified as having a particular location ID and their authentication status is identified as invalid, but no other identifying information is available. For example, component 102A(3) is invalid, perhaps a counterfeit device that does not have a proper cryptographic identity. Thus, component 102A(3) is shown as present and in a particular location, but because it has an invalid authentication status, there is no additional data present to describe it, such as PID and SN. For components 102 that have been identified as unsupported, they are identified as having a particular location ID and their authentication status is identified as unsupported. Some unsupported components 102 may have additional information available in the manifest, such as PID and SN, that an authenticator component 104 is able to extract, and some unsupported components may not have any additional data available in the manifest as they are not recognizable by an authenticator component 104. For example, component 102A(2) shown in manifest 112, is shown as occupying a particular location and in addition its PID and SN are shown, having been extracted by authenticator 104A. Alternately, component 102B(2) shown in manifest 112, occupies a particular location in the system, but is an unsupported component not recognized by the authenticator component 104B, thus it does not have any additional data to identify it.

Figure 3:
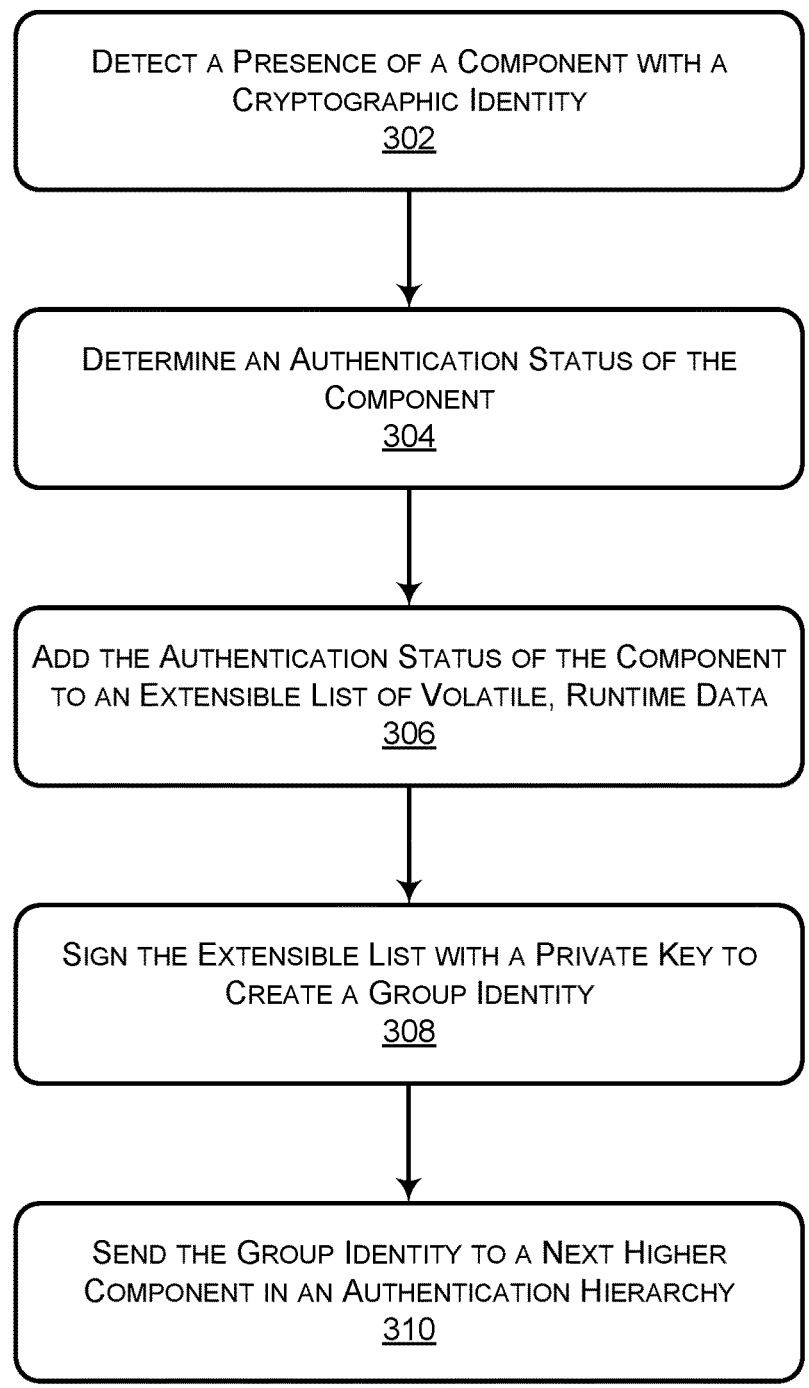
FIG. 3 illustrates an example process for authenticating a component by an authenticator component in an authentication hierarchy.

FIG. 3 illustrates a flow diagram of an example process 300 for authenticating a component in a component group. The process 300 is performed, at least in part, by an authenticator component in a hierarchy of authenticator components as described above with reference to FIG. 1.

At an operation 302, an authenticator component detects the presence of a component with a cryptographic identity. For example, a pluggable component (e.g., a SFP optical transceiver or a hot-swappable/redundant power supply) in a component group may explicitly indicate its presence via an electrical signaling mechanism, for example, GPIO pins. In some embodiments, fixed components that are a permanent part of a system design may be implicitly assumed by an authenticator component. In still another example, components may be detected by a process defined by the authenticator component.

At an operation 304, the authenticator component determines an authentication status of the component. For example, the authenticator component may determine the authentication status according to an IEEE 802.1AR compatible process, or any other appropriate component authentication process. The component is determined to be valid, invalid, or unsupported.

At an operation 306, the authenticator component adds the authentication status of the component and the location of the component in the system to an extensible list of volatile runtime data. If the component is determined to be valid, the authenticator component also extracts authentic information from the component that uniquely identifies the component, such as PID, SN, and any other additional data determined to be necessary, for example firmware version number or PCR content. If the authenticator component determines that the component is invalid, the authenticator component notes the presence of the component and the location of the component, but does not extract any additional identifying information about the component. If the component is unsupported, the authenticator component notes the location ID of the component, its authentication status as unsupported, and extracts any other recognizable information from the component such as PID and SN, however, it may not recognize any additional information, in which case no additional data will be added to the extensible list.

At an operation 308, the authenticator component signs the extensible list with its private key, creating a digitally signed group identity containing authenticated information for each component in the group, including itself.

At an operation 310, the authenticator component sends the group identity to a next higher component in the authentication hierarchy. The next higher component may be another authenticator component, or it may be a processor at the top of the authentication hierarchy.

Figure 4:
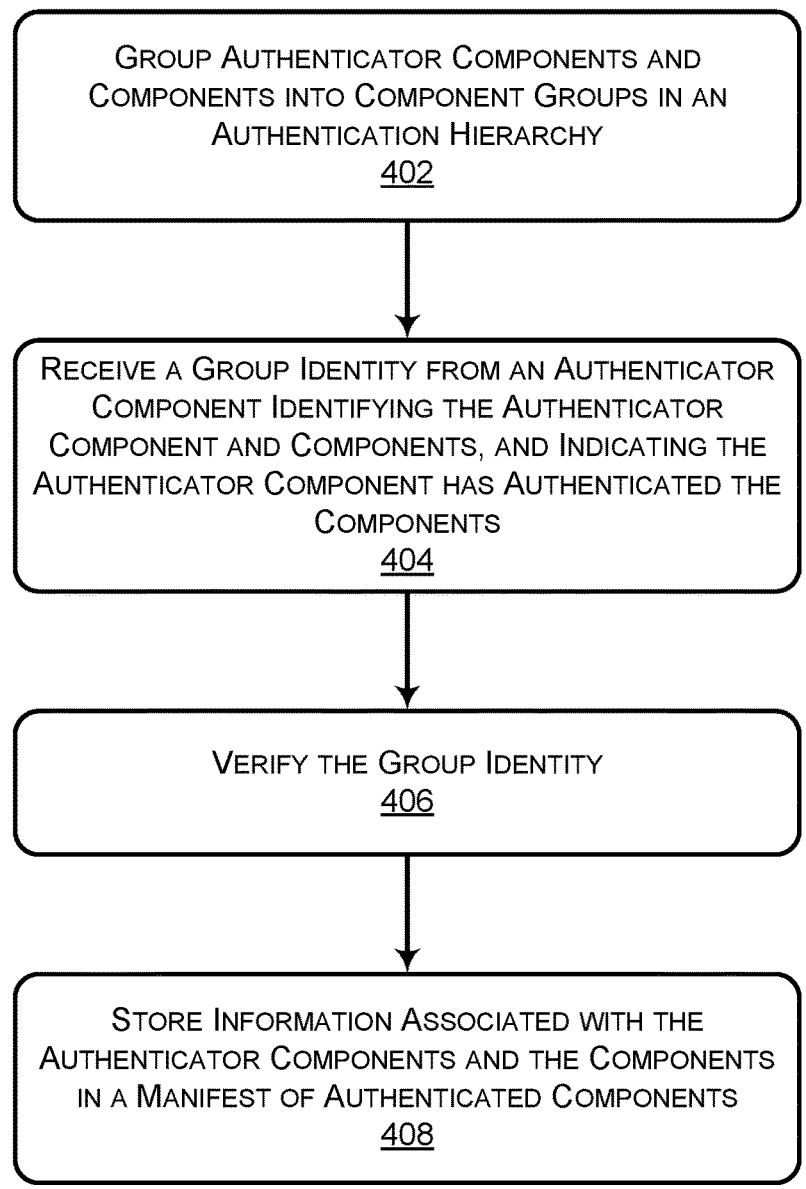
FIG. 4 illustrates an example process for grouping components in a system into component groups, authenticating the components and storing component authentication information in a manifest of authenticated components.

FIG. 4 illustrates a flow diagram of an example process 400 for grouping authenticator components and components in a system into component groups in an authentication hierarchy, authenticating the groups and storing authentication information for each component in the hierarchy in a manifest of authenticated components. The process 400 is performed, at least in part, by a processor at the top of an authentication hierarchy as described above with reference to FIG. 1.

At an operation 402, authenticator components and components are grouped into component groups in an authentication hierarchy. Each component group includes one or more components and an authenticator component capable of authenticating components containing cryptographic identities and other authenticator components. In some instances, a component group may be connected to another authenticator component in the authentication hierarchy.

At an operation 404, a group identity is received from an authenticator component. The group identity identifies the authenticator component and one or more components in a component group, and indicates that the authenticator component has authenticated the components. The group identity contains information uniquely identifying each of the components and the authenticator component in the component group. The group identity may be received by another authenticator component in the hierarchy, or by the processor at the top of the hierarchy.

At an operation 406, the group identity is verified. In some examples, a processor at the top of the authentication hierarchy verifies the group identity. To verify the group identity, the processor verifies the digital signature of an authenticator component in the group identity, after the authenticator component's identity is authenticated. If the digital signature is valid, the processor can be assured that the authentication status and other component information listed in the group identity can be trusted. The processor authenticates the digital signature of the authenticator component according to the IEEE 802.1AR Standard for Local and Metropolitan Area Network Secure Device Identity or another acceptable component authentication process. In another instance, a second authenticator component may verify the group identity by authenticating the digital signature of the authenticator component received with the group identity and trusting the component information listed in the group identity if the digital signature is determined to be valid.

At an operation 408, information in the group identity that uniquely identifies the authenticator component and the one or more components in the component group, is stored in a manifest of authenticated components in the system.

Figure 5:
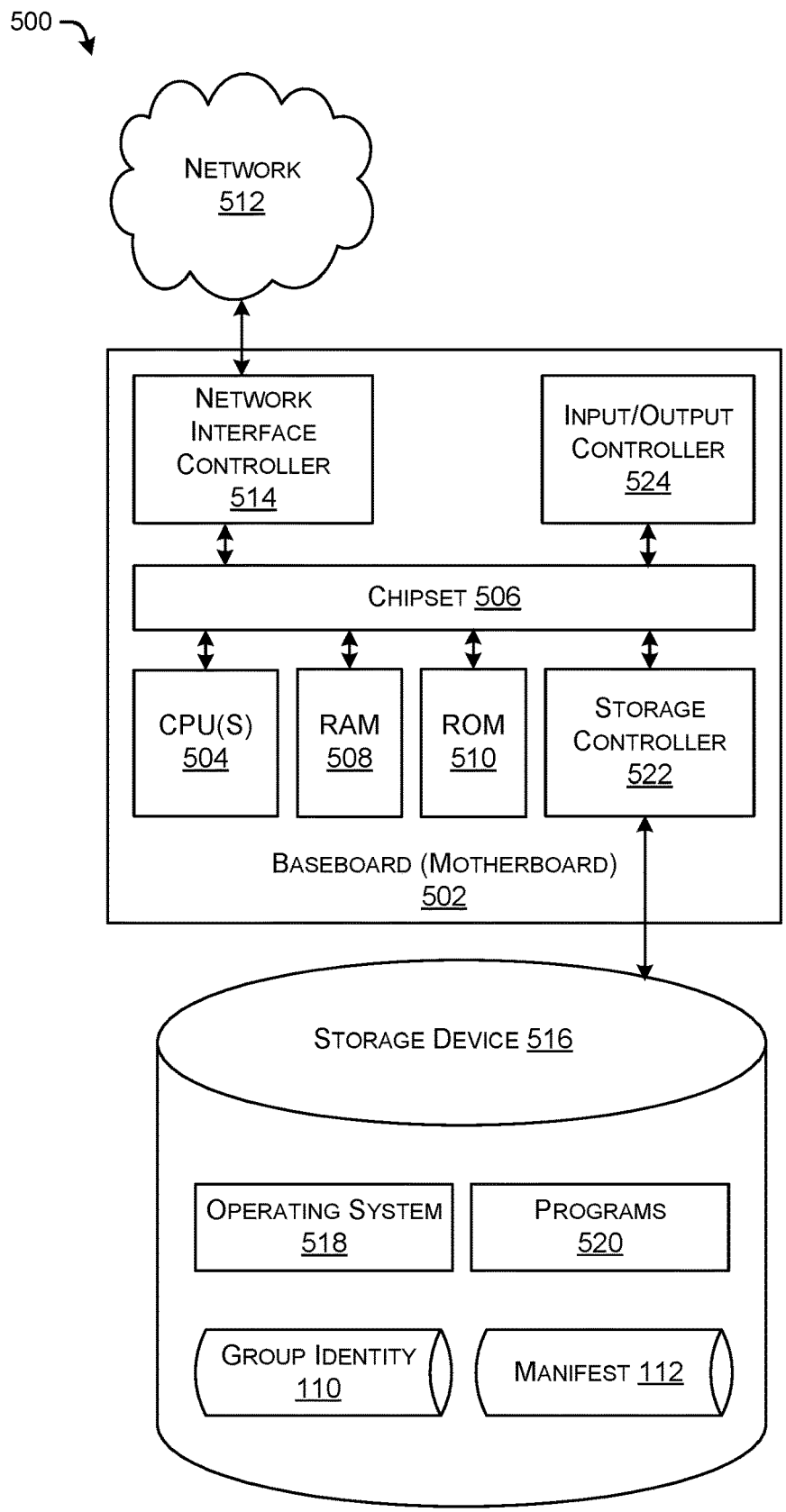
FIG. 5 is a computer architecture diagram showing an illustrative computer hardware architecture for implementing computing devices configured to implement the techniques described herein.

FIG. 5 shows an example computer architecture diagram illustrating computer hardware architecture for implementing a device 500 capable of implementing the functionality described above. The computer architecture shown in FIG. 5 illustrates a conventional server computer, workstation, desktop computer, laptop, network appliance, or other computing device, and can be utilized to execute any of the software components presented herein. The processor 108, an authenticator component 104, a component 102, and the administrator device 114, described above, may include some or all of the components discussed below with reference to the device 500.

The device 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the device 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a random-access memory (RAM) 508, used as the main memory in the device 500. The chipset 506 can further provide an interface to a computer-readable storage medium such as a read-only memory (ROM) 510 or non-volatile RAM (NVRAM) for storing basic routines that help to startup the device 500 and to transfer information between the various components and devices. The ROM 510 or NVRAM can also store other software components necessary for the operation of the device 500 in accordance with the configurations described herein.

The computer device can operate in a networked environment using logical connections to remote computing devices and computer systems through a network 512. The chipset 506 can include functionality for providing network connectivity through a network interface controller (NIC) 514, such as a gigabit Ethernet adapter. The NIC 514 is capable of connecting the device 500 to other computing devices over the network 512. It should be appreciated that multiple NICs 514 can be present in the device 500, connecting the device 500 to other types of networks and remote computer systems. In some instances, the NICs 514 may include at least one ingress port and/or at least one egress port.

The device 500 can be connected to a storage device 516 that provides non-volatile storage for the computer. The storage device 516 can store an operating system 518, programs 520, and data, which have been described in greater detail herein. Further, the storage device 516 may store data and/or instructions for performing functions related to the group identity 110, and the manifest 112, or any combination thereof. The storage device 516 can be connected to the device 500 through a storage controller 522 connected to the chipset 506. The storage device 516 can consist of one or more physical storage units. The storage controller 522 can interface with the physical storage units through a serial attached small computer system interface (SCSI) (SAS) interface, a serial advanced technology attachment (SATA) interface, a fiber channel (FC) interface, or other type of interface for physically connecting and transferring data between computers and physical storage units.

The device 500 can store data on the storage device 516 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 516 is characterized as primary or secondary storage, and the like.

For example, the device 500 can store information to the storage device 516 by issuing instructions through the storage controller 522 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The device 500 can further read information from the storage device 516 by detecting the physical states or characteristics of one or more particular locations within the physical storage units.

In addition to the storage device 516 described above, the device 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 500.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 516 can store an operating system 518 utilized to control the operation of the device 500. According to one embodiment, the operating system comprises the LINUX™ operating system. According to another embodiment, the operating system includes the WINDOWS' SERVER operating system from MICROSOFT Corporation of Redmond, Washington. According to further embodiments, the operating system can comprise the UNIX' operating system or one of its variants. It should be appreciated that other operating systems can also be utilized. The storage device 516 can store other system or application programs and data utilized by the device 500.

In one embodiment, the storage device 516 or other computer-readable storage media is encoded with computer-executable instructions which, when loaded into the device 500, transform the computer from a general-purpose computing system into a special-purpose computer capable of implementing the embodiments described herein. These computer-executable instructions transform the device 500 by specifying how the CPUs 504 transition between states, as described above. According to one embodiment, the device 500 has access to computer-readable storage media storing computer-executable instructions which, when executed by the device 500, perform the various processes described above with reference to FIGS. 1-4. The device 500 can also include computer-readable storage media having instructions stored thereupon for performing any of the other computer-implemented operations described herein.

As illustrated in FIG. 5, the storage device 516 stores programs 520, which may include one or more processes. The process(es) may include instructions that, when executed by the CPU(s) 504, cause the device 500 and/or the CPU(s) 504 to perform one or more operations.

The device 500 can also include one or more input/output controllers 524 for receiving and processing input from a number of input devices, such as a keyboard, a mouse, a touchpad, a touch screen, an electronic stylus, or other type of input device. Similarly, an input/output controller 524 can provide output to a display, such as a computer monitor, a flat-panel display, a digital projector, a printer, or other type of output device. It will be appreciated that the device 500 might not include all of the components shown in FIG. 5, can include other components that are not explicitly shown in FIG. 5, or might utilize an architecture completely different than that shown in FIG. 5.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

The invention claimed is:

1. A system comprising:
one or more processors; and
one or more non-transitory computer-readable media storing computer-executable instructions that, when executed by the one or more processors, cause the one or more processors to perform acts comprising:
storing, by a first authenticator component, an indication that a component having a cryptographic identity is currently associated with a component group in an authentication hierarchy of component groups, the component group comprising the component and a second authenticator component capable of authenticating the component;
receiving, by the first authenticator component, a first group identity from the second authenticator component, the first group identity including: (i) an identity of the second authenticator component and the component, (ii) an authentication status of the component, the authentication status indicating whether the component is valid, invalid, or unsupported, and (iii) a digital certificate of the second authenticator component;
verifying, by the first authenticator component, the first group identity, wherein verifying the first group identity comprises determining the digital certificate of the second authenticator component is valid;
storing, by the first authenticator component, information associated with the second authenticator component and the component in an extensible list of volatile, runtime data;
signing, by the first authenticator component, the extensible list with a private key to create a second group identity; and
sending the second group identity to a next higher authenticator component in the authentication hierarchy.

2. The system of claim 1, wherein the component is a first component and the acts further comprising:
storing an indication that a second component having a second cryptographic identity is currently associated with the component group;

receiving, by the first authenticator component, the first group identity from the second authenticator component, the first group identity including: (i) the identity of the second authenticator component, the first component, and the second component, authentication status of the first component and the second component, the authentication status indicating whether the first component and the second component are valid, invalid, or unsupported;

verifying, by the first authenticator component, the first group identity; and storing information associated with the second authenticator component, the first component, and the second component in the extensible list of volatile, runtime data.

3. The system of claim 1, wherein verifying the first group identity comprises determining that the second authenticator component has a valid authentication status.

4. The system of claim 1, wherein the information stored in the extensible list comprises a component location ID, an authentication status, a product identifier (PID), and a serial number (SN) for each authenticated component in the system.

5. The system of claim 1, the acts further comprising creating a table populated with information relating to authenticated components listed in the extensible list and outputting the table to an administrator device.

6. The system of claim 1, the acts further comprising:

receiving, by the first authenticator component, a third group identity from an authenticator component comprising information relating to a change in a component in a component group;

verifying, by the first authenticator component, the third group identity; and updating, by the first authenticator component, the extensible list with information relating to the change.

7. The system of claim 6, wherein the change comprises at least one of:

a component removed from a location;
a component added to a location; or
a component removed from one location and added to a different location.

8. The system of claim 1, wherein an authenticator component is periodically polled to determine if a change relating to a component in a component group has occurred.

9. The system of claim 1, wherein the component having the cryptographic identity is one of a Small Form-factor Pluggable (SFP) optical transceiver, a hot-swappable/redundant power supply, or a fan tray.

10. The system of claim 1, wherein the component having the cryptographic identity is a software component.

11. A method comprising:

storing, by a first authenticator component, an indication that a component having a cryptographic identity is currently associated with a component group in an authentication hierarchy of component groups, the component group comprising the component and a second authenticator component capable of authenticating the component;

receiving, by the first authenticator component, a first group identity from the second authenticator component, the first group identity including: (i) an identity of the second authenticator component and the component, (ii) an authentication status of the component, the authentication status indicating whether the component is valid, invalid, or unsupported, and (iii) a digital certificate of the second authenticator component;

verifying, by the first authenticator component, the first group identity, wherein verifying the first group identity comprises determining the digital certificate of the second authenticator component is valid;

storing, by the first authenticator component, information associated with the second authenticator component and the component in an extensible list of volatile, runtime data;

signing, by the first authenticator component, the extensible list with a private key to create a second group identity; and sending the second group identity to a next higher authenticator component in the authentication hierarchy.

12. The method of claim 11, wherein the component having the cryptographic identity is a software component.

13. The method of claim 11, wherein the information stored in the extensible list comprises a component location ID, an authentication status, a product identifier (ID), and a serial number (SN) for each authenticated component in a system.

14. The method of claim 11, further comprising creating a table populated with information relating to authenticated components listed in the extensible list and outputting the table to an administrator device.

15. The method of claim 11, further comprising:

receiving, by the first authenticator component, a third group identity from an authenticator component comprising information relating to a change in a component in a component group;

verifying, by the first authenticator component, the third group identity; and updating, by the first authenticator component, the extensible list with information relating to the change.

16. The method of claim 15, wherein the change comprises at least one of:

a component removed from a location;
a component added to a location; or
a component removed from one location and added to a different location.

17. The method of claim 11, wherein an authenticator component is periodically polled to determine if a change relating to a component in a component group has occurred.

18. The method of claim 11, wherein the component having the cryptographic identity is one of a Small Form-factor Pluggable (SFP) optical transceiver, a hot-swappable/redundant power supply, or a fan tray.

19. One or more non-transitory computer-readable media storing instructions that, when executed, cause one or more processors to perform acts comprising:

storing, by a first authenticator component, an indication that a component having a cryptographic identity is currently associated with a component group in an authentication hierarchy of component groups, the component group comprising the component and a second authenticator component capable of authenticating the component;

receiving, by the first authenticator component, a first group identity from the second authenticator component, the first group identity including: (i) an identity of the second authenticator component and the component, (ii) an authentication status of the component, the authentication status indicating whether the component is valid, invalid, or unsupported, and (iii) a digital certificate of the second authenticator component;

verifying, by the first authenticator component, the first group identity, wherein verifying the first group identity comprises determining the digital certificate of the second authenticator component is valid;

storing, by the first authenticator component, information associated with the second authenticator component and the component in an extensible list of volatile, runtime data;

signing, by the first authenticator component, the extensible list with a private key to create a second group identity; and sending the second group identity to a next higher authenticator component in the authentication hierarchy.

* * * * *